June 21, 1932.　　　B. W. WILLIG　　　1,863,780
SCARIFIER
Filed Sept. 2, 1931　　　5 Sheets-Sheet 4
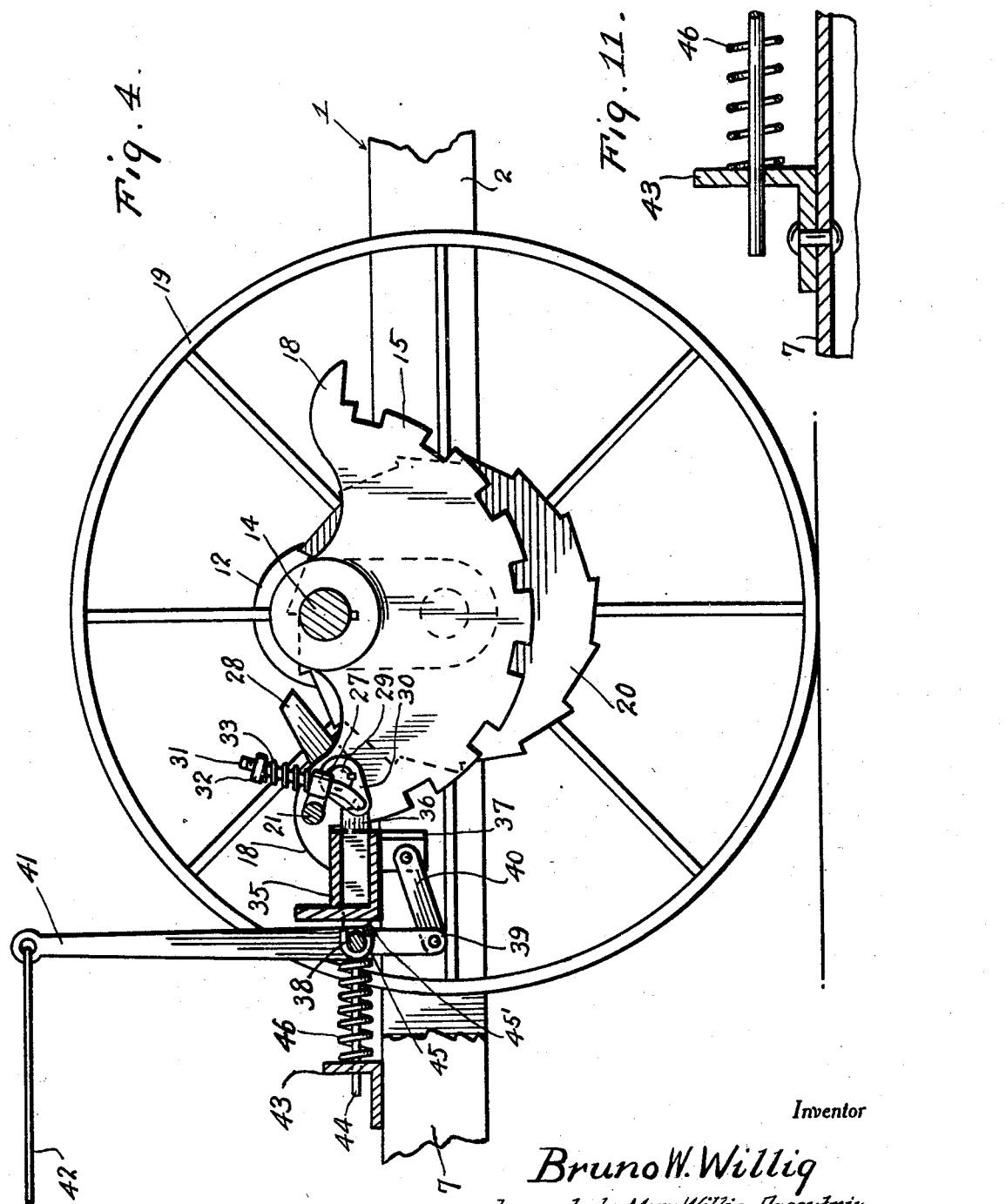
Inventor
Bruno W. Willig
deceased, by Mary Willig, Executrix
By Clarence A. O'Brien
Attorney June 21, 1932. B. W. WILLIG 1,863,780
SCARIFIER
Filed Sept. 2, 1931 5 Sheets-Sheet 5
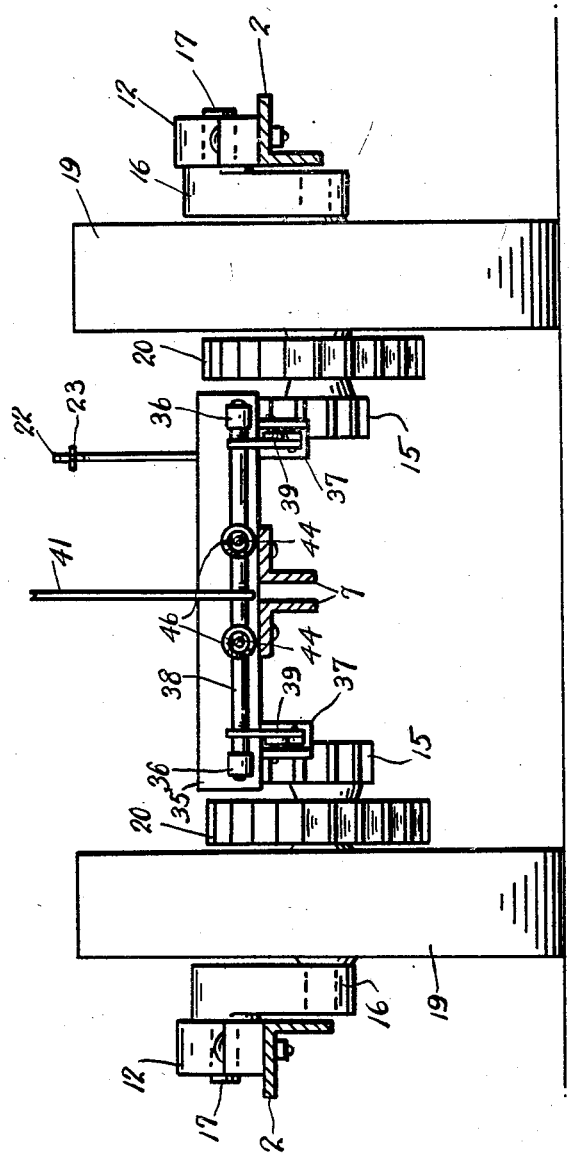
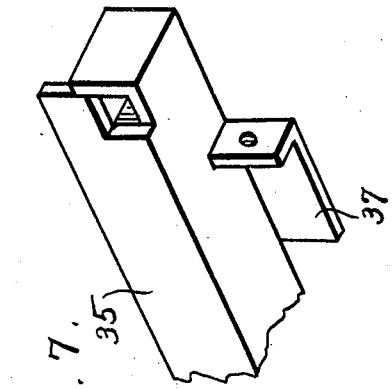
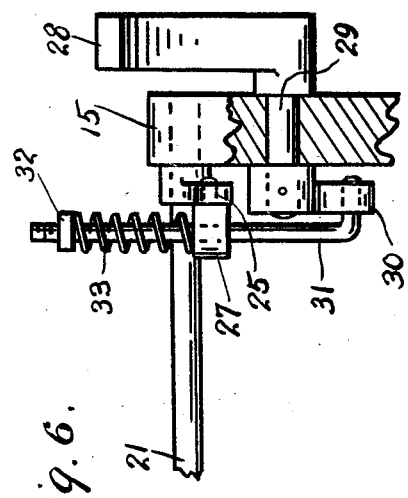
Inventor
Bruno W. Willig
deceased, by Mary Willig Executrix
By Clarence A. O'Brien
Attorney Patented June 21, 1932

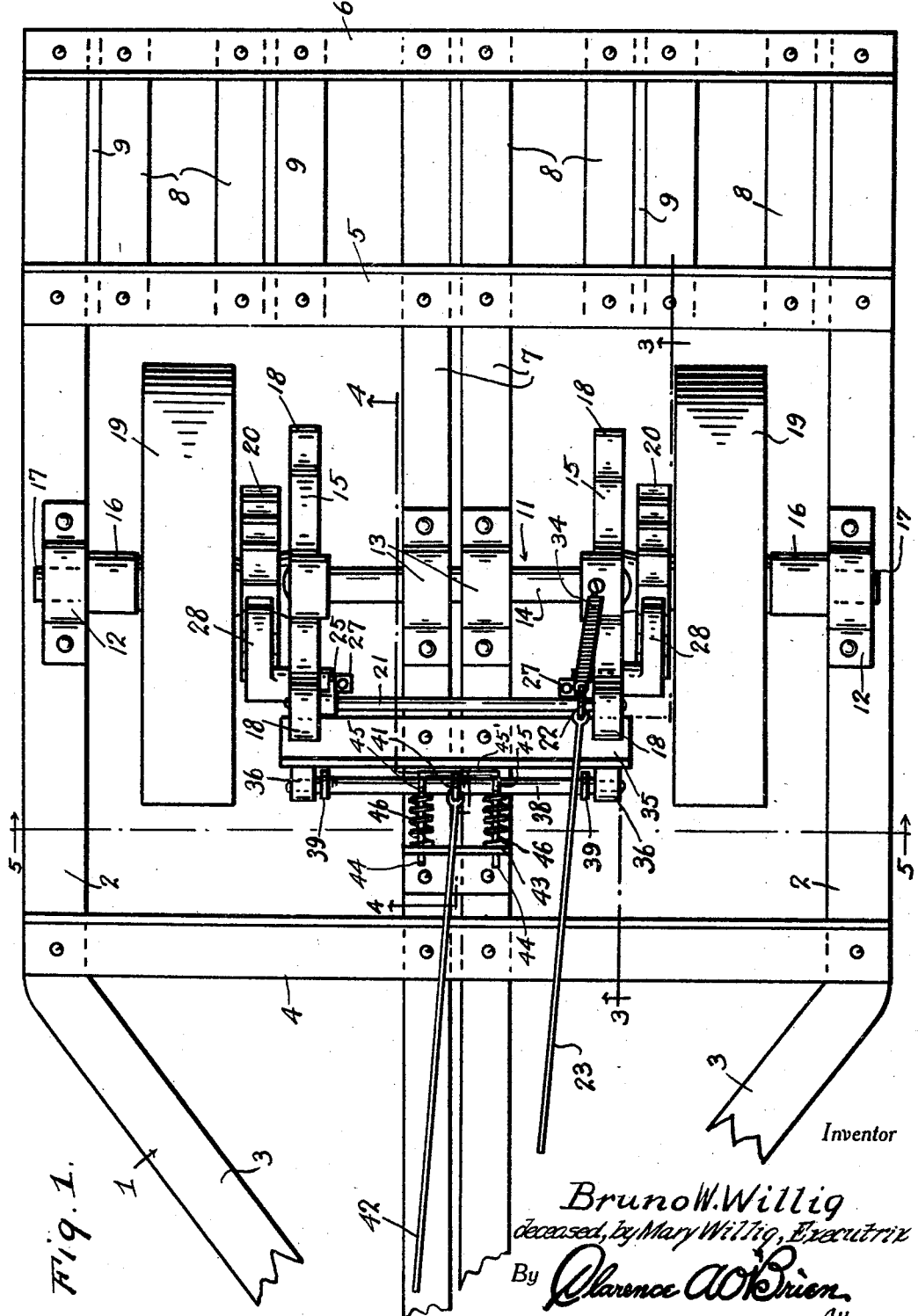

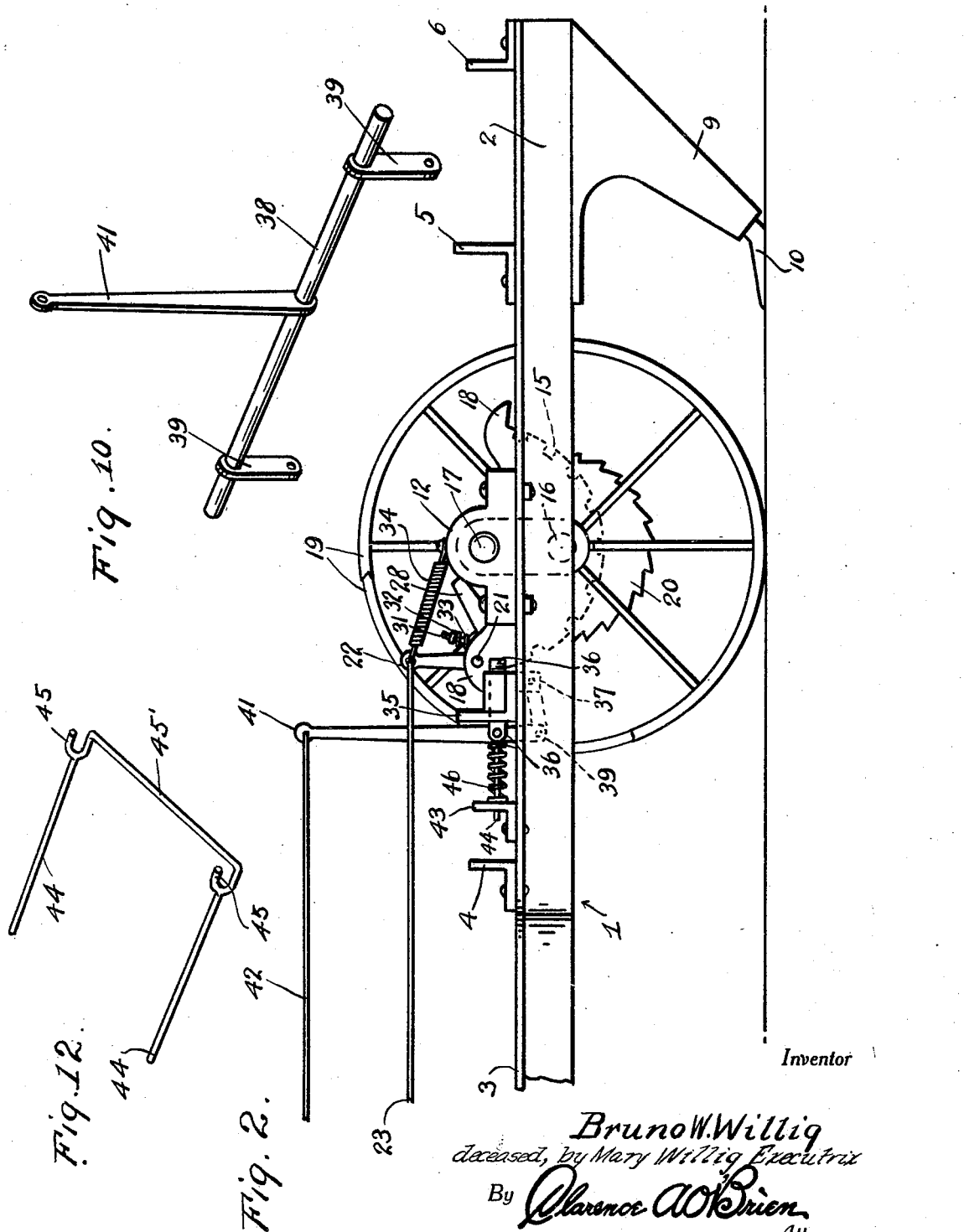

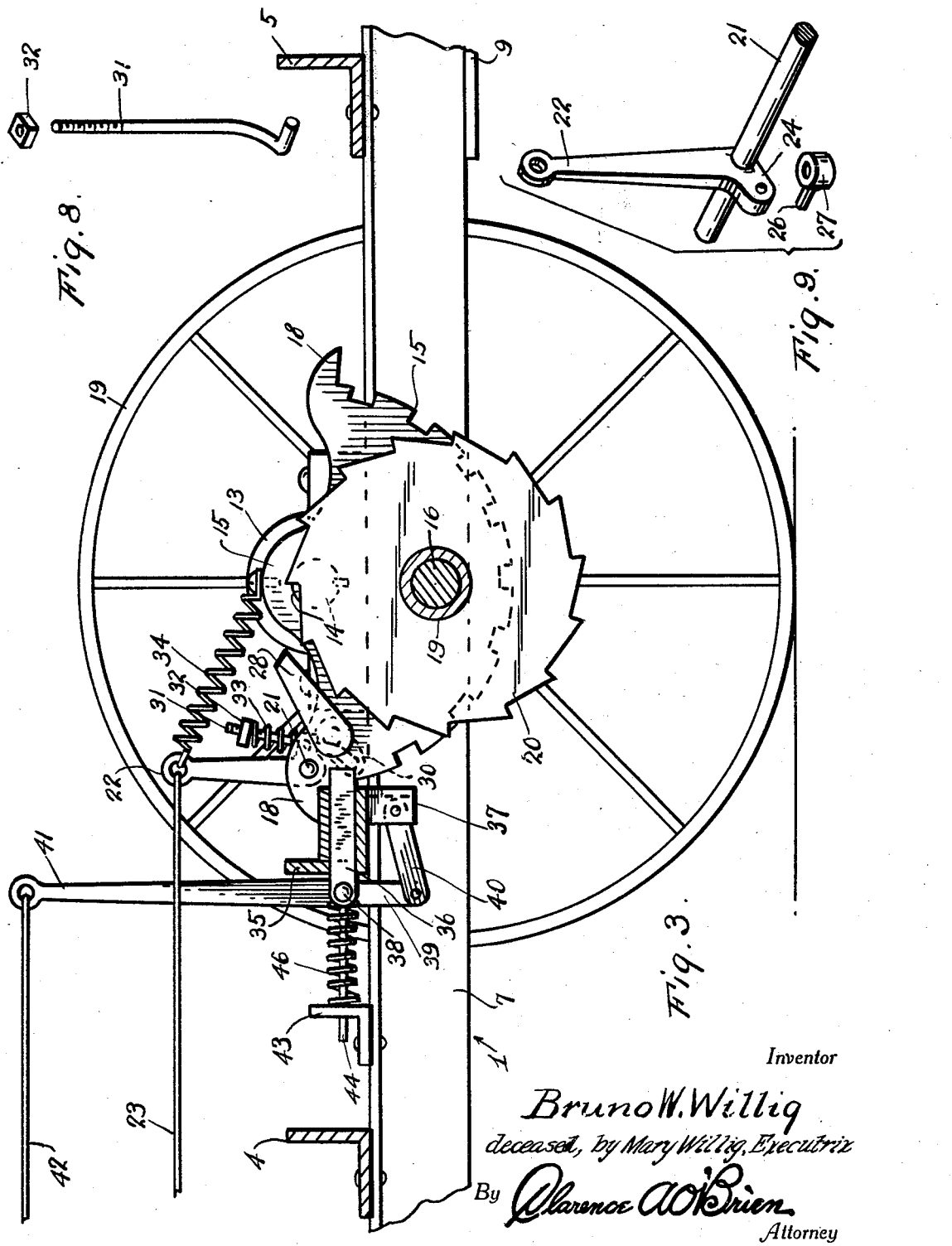

1,863,780

UNITED STATES PATENT OFFICE

BRUNO W. WILLIG, DECEASED, LATE OF SAN ANGELO, TEXAS, BY MARY WILLIG, EXECUTRIX, OF SAN ANGELO, TEXAS

SCARIFIER

Application filed September 2, 1931. Serial No. 560,832.

This invention relates to scarifiers, and has for one of its important objects to provide, in a manner as hereinafter set forth, an instrument of this character embodying the novel construction, combination and arrangement of parts, through the medium of which the ground working elements may be expeditiously adjusted vertically as desired with a minimum of effort on the part of the operator.

Other objects of the invention are to provide a scarifier of the aforementioned character which will be simple in construction, strong, durable, efficient and reliable in operation and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in top plan showing the major portion of a scarifier in accordance with this invention.

Figure 2 is a view in side elevation thereof.

Figure 3 is a view in vertical longitudinal section taken substantially on the line 3—3 of Figure 1.

Figure 4 is a view in vertical longitudinal section taken substantially on the line 4—4 of Figure 1.

Figure 5 is a view in vertical cross section taken substantially on the line 5—5 of Figure 1, looking in the direction indicated by the arrows.

Figure 6 is a detail view showing the means for connecting the pivoted dogs or pawls to the actuating shaft.

Figure 7 is a view in perspective of one end portion of the transversely disposed bar which supports the keepers.

Figure 8 is a detail view in elevation of one of the rods for connecting the shaft to one of the pivoted pawls.

Figure 9 is a fragmentary view in perspective showing the end portion of the pawl actuating shaft to which the operating cable or rope is attached, showing the means for connecting said cable or rope and for connecting that end of the shaft with the adjacent pivoted pawl.

Figure 10 is a detail view in perspective of the slidable keeper operating rod and lever.

Figure 11 is a fragmentary detail view in vertical longitudinal section showing the abutment for the springs which yieldingly urge the slidable keepers toward their operative position.

Figure 12 is a detail view in perspective of the connected slidably mounted rods for engaging the keepers with the toothed segments.

Referring now to the drawings in detail, it will be seen that the scarifier constituting the present invention comprises a frame which is designated generally by the reference numeral 1, said frame including a pair of longitudinal bars 2 having the forwardly converging portions 3, a forward cross bar 4 connected to the side bars 2 adjacent the point where said side bars merge with the portions 3, and a pair of spaced parallel, rear, cross bars 5 and 6. The frame 1 further includes a pair of longitudinally disposed intermediate bars 7 which are spaced slightly from each other and which extend from the rearmost cross bar 6 to the forward end of the frame.

It may be well to here mention that the machine is intended to be attached in any suitable manner to a tractor or other draft vehicle and controlled therefrom. The bars constituting the frame 1 are preferably of angle iron having one leg or flange disposed horizontally and the other leg or flange disposed vertically. The vertical legs or flanges of the elements 2, 3 and 7 are disposed downwardly, the legs or flanges of the elements 7 depending from the adjacent edges of said elements 7. Then, the vertical legs or flanges of the elements 4, 5 and 6 extend upwardly from the horizontal legs or flanges of these elements.

Also, the vertical flanges of the elements 2 depend from the inner edges of said elements 2. Extending between the transverse bars 5 and 6 and rigidly secured thereto are the bars 8 of angle iron. Certain of the bars 8 are arranged in pairs while the outermost thereof are disposed singly with depending legs or flanges arranged in opposed relation to the corresponding legs or flanges of the side bars 2 of the frame 1. The vertical legs or flanges of the bars 8 which are disposed in pairs are on the edges of said pairs which are adjacent to each other. Any desired number of the bars 8 may be provided and the same may be spaced as desired.

Secured by any suitable means between the depending vertical flanges of the pairs of bars 8 and between the depending vertical flanges of the outermost of the bars 8 and the vertical flanges of the adjacent portions of the side bars 2 are the holders 9 in which are mounted the scarifying elements 10. The elements 10 may be detachably secured in the holders 9 in any suitable manner.

The reference numeral 11 designates generally a crank axle which is journalled in the bearings 12 and 13 provided therefor on intermediate portions of the frame members 2 and 7 respectively. The bearings 12 and 13 are, of course in transverse alinement and are mounted on the upper sides of the members 2 and 7.

The crank axle 11 includes a shaft 14 journalled in the bearings 13 and projecting outwardly therefrom. Fixed on the end portions of the shaft 14 are the toothed segments 15 which constitute the inner arms of the cranks 16 of the crank axle 11. The outer arms of the cranks 16 are provided with trunnions 17 which are journalled in the bearings 12. On their ends, the toothed segments 15 are provided with stops or abutments 18 for a purpose which will be presently set forth.

Journalled for rotation on the cranks 16 of the axle 11 are the supporting wheels 19 and fixed to said supporting wheels for rotation therewith in any suitable manner, preferably to the hubs thereof and on the inner sides of said wheels are the ratchet disks 20.

A horizontally disposed shaft 21 has its ends journalled for oscillation in the forward end portions of the toothed segments 15 and fixed to one end portion of said shaft is an upstanding lever 22 to the upper or free end portion of which an actuating cable or rope 23 is connected. Formed integrally with the lower end of the lever 22 is an angularly disposed arm 24. An arm 25 is fixed to the other end portion of the shaft 21. The arms 24 and 25 are apertured for the reception of pins 26 extending laterally from the eyes 27 for mounting said eyes for rocking movement on the inner sides of the arms 24 and 25.

Mounted for swinging movement in a vertical plane on the outer sides at the forward end portions of the toothed segments 15 are the pawls 28 which are engageable with the ratchet disks 20. The pawls 28 include the pintles 29 which are journalled in the segments 15, said pintles extending through the segments and having fixed on their inner end portions the arms 30 the latter having openings in their free end portions for the reception of the angularly disposed lower end portions of the rods 31 which extend slidably through the eyes 27. The upper end portions of the rods 31 are threaded and mounted for adjustment thereon are the nuts 32. Coil springs 33 are mounted on the rods 31 and have one end engaged with the nuts 32 and their other ends engaged with the eyes 27. The coil springs 33 constitute means whereby rotation of the shaft 21 in one direction may be continued after the pawls 28 have been engaged with the ratchet disks 20.

A coil spring 34 is also connected with the upper end portion of the lever 22 for actuating the shaft 21 in a direction to normally maintain the pawls 28 out of engagement with the ratchet disk 20. One end of the spring 34 is connected with the lever 22 and the other end thereof may be connected with the adjacent toothed segment 15.

Mounted transversely on the intermediate longitudinal bars 7 of the frame 1 forwardly of the bearings 13 is a bar 35 in the end portions of which are mounted the longitudinally slidable keepers 36 which are operatively engageable with the toothed segments 15 for releasably locking the implement in adjusted position. The stops or abutments 18 on the ends of the tooth segments 15 are engageable with the end portions of the bar 35 for limiting the rotary movement of the crank axle 11 in operative directions. Brackets 37 depend from the outer portions of the bar 35. The reference numeral 38 designates a rod having its end portions journalled in the forward end portions of the keepers 36. Arms 39 are mounted on the rods 38 and depend therefrom and links 40 have one end pivotally connected to the lower end portions of the arms 39 and their other ends pivotally connected to the brackets 37 thereby supporting the rod 38 for swinging movement on the bar 35.

An upstanding lever 41 is fixed to an intermediate portion of the rod 38 and has connected to its free end portion an actuating cable or rope 42. The cables or ropes 23 and 42 extend forwardly to the tractor or other draft implement within convenient reach of the operator.

The reference numeral 43 designates an angle iron bracket mounted transversely on the bars 7 on the frame 1 forwardly of the bar 35. Extending slidably through the bracket 43 is a pair of rods 44 having yokes or forks 45 on the rear ends thereof which straddle the rod 38. Coil springs 46 encircle the rods 44 and have their forward ends engaged with the bracket 43 and their rear ends engaged with the yokes or forks 44 for yieldingly urging the said rods 44, and consequently the rod 38, rearwardly for urging the keepers 36 into engagements with the toothed segments 15. The yokes 45 are connected by an integral rod 45'.

In operation, the position of the frame 1 relative to the ground may be adjusted by rotating the crank axle 11, as will be obvious. Upon rotation of the crank axle 11 upon which the supporting wheels 19 are journalled in one direction, the frame 1 will be raised and upon rotation of said crank axle relative to the frame in the opposite direction the frame will be lowered. The slidable keepers 36, being normally engaged with the toothed segments 15, lock the crank axle against rotation on the frame 1 and in this manner said frame is retained in adjusted position.

When it is desired to lower the frame 1 and, of course the scarifying elements 10, the lever 41 is actuated through the medium of the cable or rope 42 to swing the rod 38 forwardly on the arms 39 and the links 40 to disengage the keepers 36 from the toothed segments 15 and the frame 1 is permitted to drop by gravity. As before stated the coil springs 46 urge the keepers 36 into engagement with the toothed segments 15.

When it is desired to raise the frame 1, the keepers 36 are disengaged from the toothed segments 15 and the pawls 28 are engaged with the ratchet disks 20. Thus, as the supporting wheels 19 rotate in a forward direction and drive the ratchet disks 20, the crank axle 11, of which the toothed segments 15 are parts, is connected with the wheels by the pawls for rotation with said wheels, thereby raising the frame.

When the cranks 16 and the crank axle 11 are disposed upwardly, the stops or abutments 18 on one end of the toothed segments 15 will engage the upper side of the bar 35 and positively prevent further rotation of the crank axle in this direction. At this time, or before this occurs, the pawls 28 should be permitted to disengage the ratchet disk 20 and the keeper 36 should again be engaged with the toothed segments for securing the same in elevated or adjusted position. When the frame is permitted to drop, the stops or abutments on the other end of the toothed segments 17 engage with the lower side of the bar 35 and limits the rotation of the crank axle 11 in the opposite direction.

It is believed that the many advantages of a scarifier in accordance with this invention will be readily understood and although the preferred embodiment of the invention is as illustrated and described, it is to be understood that changes in the details of construction, and in the combination and arrangement of parts may be resorted to which will fall within the scope of the invention as claimed.

What is claimed as new is:

1. A scarifier comprising a frame, a crank axle journalled on the frame, said crank axle including a toothed plate, said toothed plate constituting one of the arms of the crank of the axle, a supporting wheel journalled on the crank axle, means for connecting the crank axle to the wheel for movement therewith, and means engageable with the crank for securing the crank axle against movement.

2. A scarifier comprising a frame, a crank axle journalled on the frame, said crank axle including a toothed plate, said plate constituting one of the arms of the crank of the axle, a supporting wheel journalled on the crank axle, a ratchet disk fixed to the wheel for rotation therewith, a pawl pivotally mounted on the plate and engageable with the ratchet disk for connecting the crank axle to the wheel for actuation by said wheel, and means engageable with the plate for securing the crank axle against movement.

3. A scarifier comprising a frame, a crank axle journalled on the frame, said crank axle including a toothed plate, said plate constituting one of the arms of the crank of the axle, a supporting wheel journalled on the crank axle, a ratchet disk fixed on the supporting wheel for rotation therewith, a pawl pivotally mounted on the plate and operatively engageable with the ratchet disk for connecting the crank axle to the wheel for actuation by said wheel, a keeper slidably supported on the frame and engageable with the plate for securing the crank axle against movement, and means connected with the keeper for manually actuating same.

4. A scarifier comprising a frame, a crank axle journalled on the frame, said crank axle including a toothed segmental plate, said plate constituting one of the arms of the crank of the axle, a supporting wheel journalled on the crank axle, a ratchet disk fixed on the supporting wheel for rotation therewith, a pawl pivotally mounted on the segmental plate operatively engageable with the ratchet disk for connecting the crank axle to the supporting wheel for actuation in one direction by said supporting wheel, manually operable means for actuating the pawl to engage same with the ratchet disk, resilient means for disengaging the pawl from the ratchet disk, a keeper slidably supported on the frame and engeagable with the segmental plate for securing the crank axle against movement, resilient means yieldingly urging the keeper into engagement with the segmental plate, and manually operable means for disengaging the keeper from the segmental plate.

5. A scarifier comprising a frame, a crank axle journalled on the frame, said crank axle including a pair of cranks, said crank axle further including toothed plates, said plates constituting one of the arms of the crank, supporting wheels journalled on the crank axle, ratchet disks fixed to the supporting wheels for rotation therewith, means on the plates engageable with the ratchet disks for connecting the crank axles to the wheels for movement with said wheels, means engageable with the plates for securing the crank axle against the movement and coacting means on the frame and on the plates for positively limiting the rotation of the crank axle in opposite directions.

6. A scarifier comprising a frame, a crank axle journalled on the frame, said crank axle including a toothed segmental plate, said plate constituting one of the arms of the crank of the axle, a supporting wheel journalled on the crank axle, means for connecting the crank axle to the wheel for movement with said wheel, a bar mounted on the frame, a keeper mounted on the bar and engageable with the plate for securing the crank axle against movement, and stops on the plate engageable with the bar for limiting the rotary movement of the crank axle in opposite direction.

7. A scarifier comprising a frame, a crank axle journalled on the frame and including a pair of cranks, said crank axle further including toothed plates constituting one of the arms of each crank, supporting wheels journalled on the crank axle, ratchet disks fixed to the supporting wheels for rotation therewith, pawls pivotally mounted for swinging movement on the plates, and engageable with the ratchet disk for connecting the crank axle to the supporting wheels for actuation in one direction thereby, a rod journalled in the plates, means connecting the pawls to the rod for actuation thereby, means for manually actuating the rod in one direction, resilient means yieldingly urging the rod in the opposite direction, and means engageable with the plates for securing the crank axle against movement.

8. A scarifier comprising a frame, a crank axle journalled on the frame and including a pair of cranks, said crank axle further including toothed plates constituting one of the arms of each crank, supporting wheels journalled on the crank axle, ratchet disks fixed to the supporting wheels for rotation therewith, pawls pivotally mounted for swinging movement on the plates, and engageable with the ratchet disk for connecting the crank axle to the supporting wheels for actuation in one direction thereby, a rod journalled in the plates, means connecting the pawls to the rod for actuation thereby, means for manually actuating the rod in one direction, resilient means yieldingly urging the rod in the opposite direction, and means engageable with the plates for securing the crank axle against movement, the last named means including a bar mounted transversely on the frame, keepers slidably mounted on the bar and engageable with the plates, resilient means yieldingly urging the keepers into engagement with the plates, and manually operable means for disengaging the keepers from the plates.

In testimony whereof, I affix my signature.

MARY WILLIG,
*Executrix of Bruno W. Willig, Deceased.*